United States Patent Office 2,905,527
Patented Sept. 22, 1959

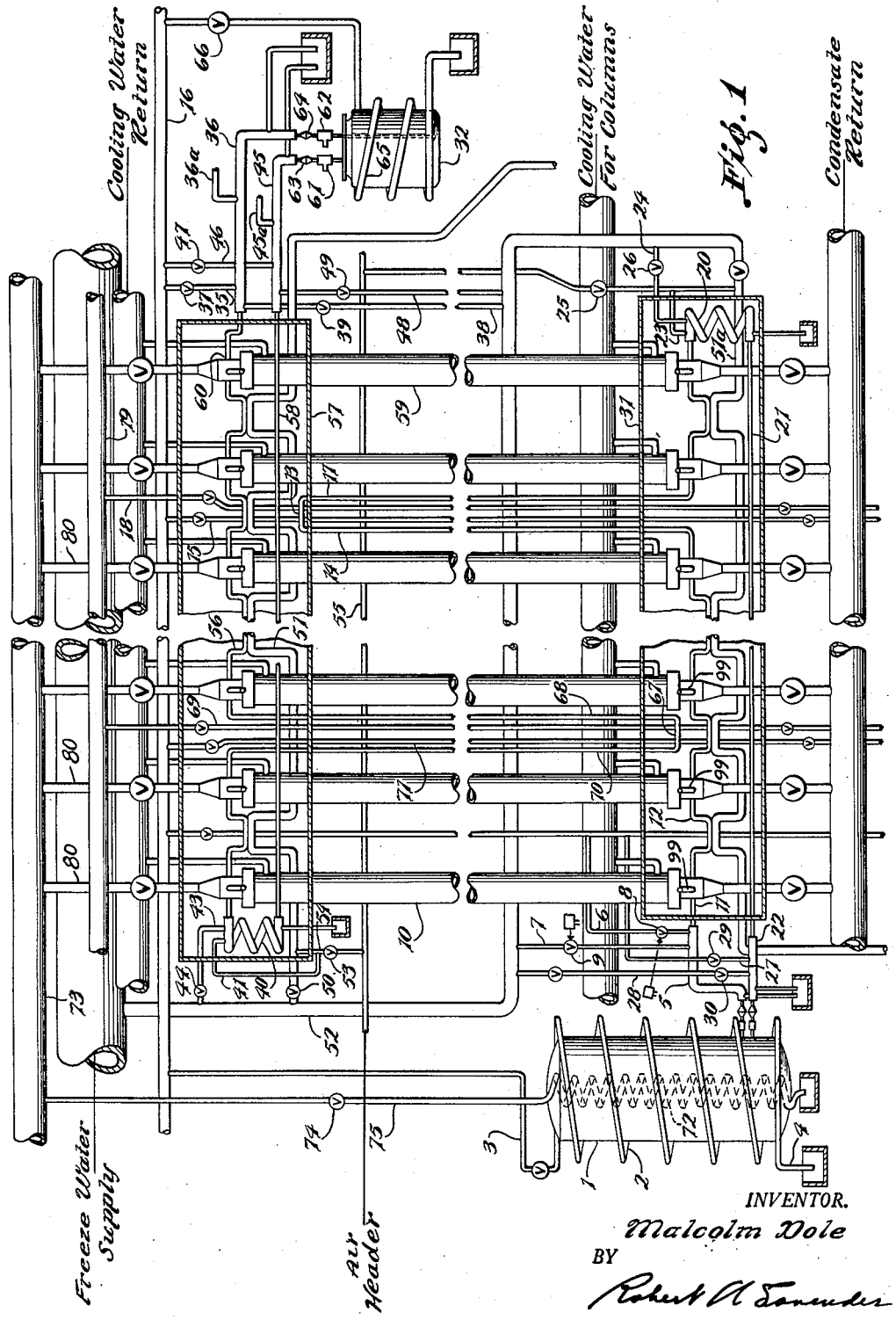

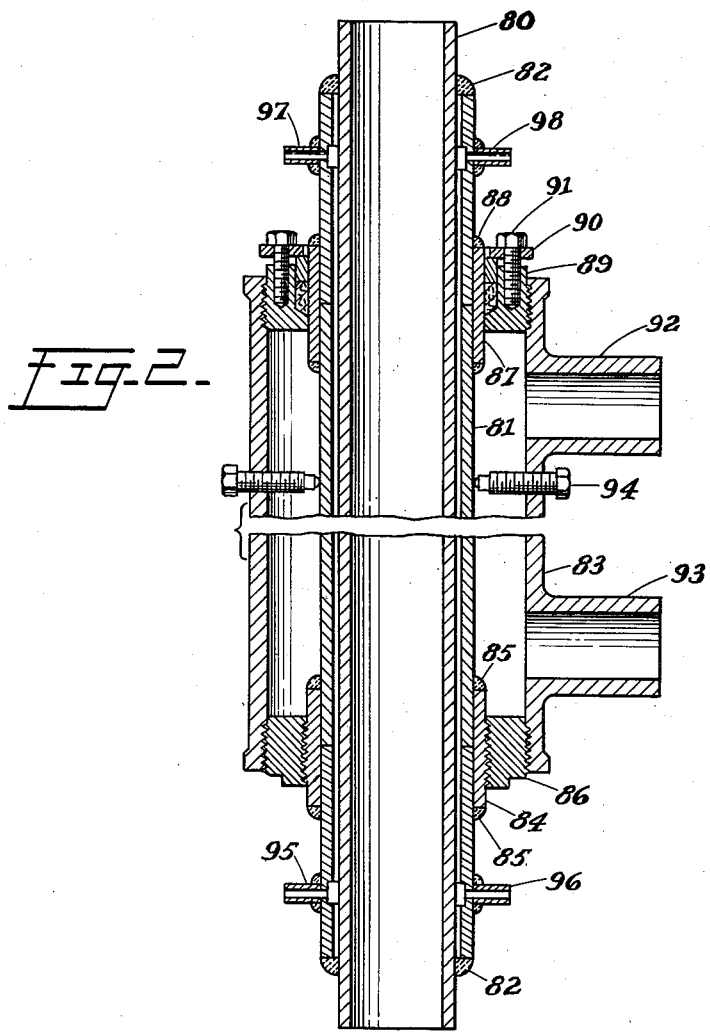

2,905,527

METHOD OF AND APPARATUS FOR WITHDRAWING LIGHT ISOTOPE PRODUCT FROM A LIQUID THERMAL DIFFUSION PLANT

Malcolm Dole, Evanston, Ill., assignor to the United States of America as represented by the United States Atomic Energy Commission Application April 25, 1946, Serial No. 664,733

8 Claims. (Cl. 23—14.5)

This invention relates to a method and apparatus for withdrawing the light isotope product from a liquid thermal diffusion plant. More particularly, this invention relates to a method and apparatus comprising a combined light isotope product withdrawal and recycle system and a fresh feed distribution and heavy isotope product recycle system in a liquid thermal diffusion plant for the separation of the isotopes of uranium.

The phenomenon of thermal diffusion occurs as the result of a temperature gradient in a mixture of two gases, or in a gas comprising two or more isotopes, whereby a gradient in the relative concentration of the two gases or isotope constituents is created. Based on the kinetic theory of gases from which may be derived the extent of difference in the rates of diffusion of gases of different molecular weights, this phenomenon, generally speaking, manifests itself in a tendency for one type of molecule to concentrate in the hotter region and the other in the colder region, or, in the case of a single gas containing two or more isotopes, generally speaking, the lighter isotope concentrates in the hotter region and the heavier isotope in the colder region.

It is believed that the phenomenon of separation by thermal diffusion can be best expressed theoretically as a function of the sine of the thermal diffusion coefficients of the components to be separated. The expression "thermal diffusion coefficient" employed in this application and in the claims appended hereto is as defined by S. Chapman and T. G. Cowling in "The Mathematical Theory of Non-Uniform Gases" (Cambridge Press, 1939). The thermal diffusion coefficient is dependent primarily on the inter-molecular forces, or attraction between the types of molecules being separated under given thermal conditions, that is to say, if a temperature gradient is introduced, there is a tendency to overcome molecular attraction producing a concentration gradient in the diffusion zone. The thermal diffusion coefficient is further dependent on the molecular weights of the components to be separated when taken in conjunction with the inter-molecular forces involved. Components having different molecular weights may be, in some cases, inseparable under certain conditions wherein the molecular forces between these components are not favorable to separation. On the other hand, it is entirely possible to separate components of like molecular weights under conditions wherein the molecular attraction between these components is favorable to separation. An additional factor entering into the thermal diffusion coefficient is the difference in size of the molecules to be separated. It is generally believed that the molecular field of attraction extends as a function of the molecular radius, the larger molecules presenting greater difficulty in overcoming the inter-molecular forces resulting in conditions less favorable to separation.

In certain types of diffusion apparatus, it is also possible to make advantageous employment of thermal convection currents within the apparatus to accelerate and facilitate separation of components of varying thermal diffusion coefficients.

It is also known that with certain modifications of thermal diffusion apparatus, the above principles can be applied to materials in either the gaseous or liquid state.

A thermal diffusion apparatus for the separation of isotopes in the liquid phase may comprise a large number of concentric tube-type diffusion columns operating in parallel, each column functioning as an individual apparatus. A column may comprise an inner tube, or hot wall, of suitable metal for the liquid being processed, through which passes a heating medium, such as high temperature steam, and an outer tube, or cold wall, of suitable metal, concentric to and at a predetermined distance from the inner tube, around which is circulated a cooling medium, such as water, the entire assembly being encased in a pipe and mounted vertically in a rack.

The columns are connected to each other both at the top and bottom by means of a system of piping known as a monorail, the top monorail for the purpose of collecting light isotope product from the tops of the clumns fr removal, and the bottom monorail for the dual purpose of distributing fresh feed to the bottoms of the columns for diffusion and collecting the heavy isotope product from the bottoms of the columns for removal. It is extremely desirable, when processing highly corrosive or toxic media and in order that product loss is maintained at an extreme minimum, that the feed and product circulation systems both at the tops and bottoms of the columns be stringently sealed. In view of this, in the preferred embodiment of this liquid thermal diffusion apparatus, all mechanical equipment such as valves, pumps, and metering devices have been eliminated from these circulation systems.

A preferred application of the above-described liquid thermal diffusion apparatus is in the separation of the isotopes of uranium. Of the compounds of uranium which are conducive to isotope separation within practical ranges of temperature and pressure, liquid uranium hexafluoride is preferred because of the relative stability of this compound within the temperature and pressure ranges most desirable for maximum separation. Furthermore, the physical characteristics of this compound are particularly adaptable for the maintenance of sealed circulation systems, i.e., the use of external means for controlling and measuring flow and rate of flow.

In a typical operation of the application referred to above, liquefied uranium hexafluoride containing isotopes $_{92}U^{234}$, $_{91}U^{235}$ and $_{92}U^{238}$, and at a pressure of between 1500–1700 pounds per square inch gauge, is introduced at the bottoms of the columns into the space between the hot and cold walls. In this particular operation of the process, the hot wall is heated by passing saturated steam at a temperature of approximately 535° F. and at a pressure of approximately 1000 pounds per square inch guage through said hot wall, and the cold wall is cooled by circulating cooling water at a temperature of approximately 150° F. around the external surface of the cold wall. The fresh feed upon being introduced into the space between the hot and cold walls is caused to diffuse, resulting in a concentration of the heavy isotope near the cold wall and of the lighter isotopes near the hot wall. Due to thermal convection, there is a flow of relatively cold liquid, rich in the heavy isotope, downward near the cold wall, and a flow of warm liquid, rich in the lighter isotopes, upward near the hot wall. This results in a concentration of the heavy isotope at the bottoms and of the lighter isotope at the tops of the column.

The diffusion operation is permitted to continue for a predetermined period of time predicated on the degree of enhancement of product desired. During the first half of this cycle, the top monorail, of the light product circulation system which includes the upper portions of the columns, has been frozen off by lowering the temperature of the monorail and connecting lines so that the liquid goes into the solid phase and no circulation can occur. At the completion of the diffusion operation, the second half of the cycle includes the unfreezing of the top monorail to permit the material to return to the liquid phase so that withdrawal of the desired light isotope product may be carried out. During this latter half cycle, the bottom monorail, or feed circulation system is frozen off. In short, the upper circulation path is frozen off by solidifying the material in the lines connected thereto while new feed material is brought into the lower portions of the columns and diffusion takes place, and then the lower circulation path is frozen by solidifying the liquid therein to prevent further feed entering the lower ends of the columns while the upper circulation path is unfrozen and the lighter liquids are removed.

It should be further noted that in this operation of the diffusion apparatus it is important that the pressure drop across the columns be controlled so that the pressure in the system does not fall below approximately 1300 pounds per square inch gauge at any point in the process flow. Operating experience has disclosed that during the product removal cycle, a reduction in pressure below this figure causes a phenomenon to occur inside the column known as "pitching," which has been interpreted as an extreme convectional turbulence which has proven to be extremely detrimental to both the apparatus and the material produced.

There are a number of theories concerning the causes of "pitching." It is generally believed, however, that this condition is the result of disturbances to the normal thermal convective flow caused by excessive pressure drop and the resultant drop in liquid level within the column. Another belief presents the theory that the same causes result in the formation of parasitic convection currents forming along the flow path of the normal convection currents causing flow across the annular space between the hot and cold walls thereby creating a condition of turbulence which tends to destroy the equilibrium of the relative concentration of light and heavy isotopes. Since "pitching" is usually accompanied by a tremendous gain in steam consumption, another belief attempts to explain the phenomenon as the result of an increase in heat transfer through the inner hot wall due to the drop in liquid level within the annular space between the hot and cold walls. Some credence can be attached to this belief because of the associated "hammering" noise which is due possibly to the condensation of the steam within the columns, similar in nature to the condensation of steam in a cold radiator in a steam heating system. An effect of this condition could be a loss of equilibrium in the column due to a turbulent viscous flow of material within the annular space of the column, rather than the desired convectional flow. It is understood, however, that the theories herein set forth are not to be construed as limiting the scope of my invention.

It became evident early in the operation of the above-described diffusion apparatus that one of the most critical factors in smooth, continuous operation is a satisfactory method for the removal of enhanced material from the tops of the columns. The first attempts at product withdrawal consisted in the attachment of individual capsules to individual columns; the capsules were then filled from the tops of the columns by the hand operations of freezing and thawing the product outlet lines, and later emptying the capsules, one by one, into shipping cylinders. The hand labor involved in this method was excessive; furthermore, the plant hazards were multiplied by the necessity of opening up every column to the atmosphere once every twenty-four hours with the resultant danger of a material break in each operation. In addition, this method was not the most efficient from the standpoint of quality of product because of the possibility of uncontrolled quantities of material being removed from each column during each product removal operation with the obvious result of the product being withdrawn contain material of lower than desired enhancement. Successful product withdrawal was largely contingent on the skill of the individual operator, since the removal of excessive quantities of material or failure to properly freeze off the material outlet lines resulted in the "pitching" condition described above caused by a pressure drop across the columns in excess of the allowable tolerance.

It is an object of this invention to provide an apparatus for the removal of light isotope diffusion product from the tops of a number of liquid thermal diffusion columns.

It is another object of this invention to provide an apparatus for the removal of light isotope diffusion product from the tops of a number of liquid thermal diffusion columns automatically and as nearly continuously as possible.

It is still another object of this invention to provide an appartus for the removal of light isotope diffusion product from the tops of a number of liquid thermal diffusion columns automatically and as nearly continuously as possible in the container in which it is to be shipped away.

It is a further object of this invention to provide an apparatus for the removal of light isotope diffusion product from the tops of a number of liquid thermal diffusion columns, automatically and as nearly continuously as possible, and, operating concurrently and in combination with this apparatus, an apparatus for the recycling of said light isotope diffusion product through the tops of said diffusion columns.

It is a still further object of this invention to provide an apparatus for the removal of light isotope diffusion product from a number of liquid thermal diffusion columns, automatically and as nearly continuously as possible, and, operating concurrently and in combination with this apparatus, an apparatus for the recycling of said light isotope diffusion product through the tops of said diffusion columns, and, operating alternately and in combination with all of the above apparatus, an apparatus for the distribution of fresh feed to the bottoms of said diffusion columns, and operating concurrently and in combination with this feed distribution apparatus, an apparatus for withdrawing heavy isotope diffusion product from the bottoms of said diffusion columns and recycling said heavy isotope diffusion product in the fresh feed stream, whereby a constant pressure is maintained throughout the system.

It is still another object of this invention to provide an apparatus which reduces the number of individual operations required to withdraw light isotope diffusion product from the tops of a number of liquid thermal diffusion columns.

It is an additional object of this invention to provide an apparatus for the removal of light isotope diffusion product from the tops of a number of liquid thermal diffusion columns wherein the necessity of adding recurrently fresh feed to the diffusion apparatus is eliminated.

It is a further object of this invention to provide a method for the removal of light isotope diffusion product from the tops of a number of liquid thermal diffusion columns wherein a constant pressure is maintained throughout the system.

These and other objects of this invention will be apparent to those skilled in the art upon becoming familiar with the following description as related to the accompanying drawing which is a side elevation view diagrammatically showing an illustrative diffusion apparatus.

In the drawings, Fig. 1 is a schematic of my improved system for the thermal diffusion and separation of lighter liquids from heavier ones. Fig. 2 is a fragmental view of a suitable form of diffusion column for use in my improved system.

In general, as already indicated to some extent, the apparatus of this invention comprises means for distributing feed, removing light and heavy product, as well as recycling the light and heavy product whereby a constant pressure is maintained throughout the system, and contains a minimum of mechanical equipment directly connected to the sealed circulation systems.

Before placing the system illustrated in the accompanying drawing in operation, it is generally the practice, particularly when the material to be processed is a corrosive substance such as $UF_6$, to subject the equipment to a conditioning treatment. This may be carried on in individual pieces of equipment or, as is generally the case, after complete or partial assembly thereof. While the particular conditioning treatment may be varied, it has been found advantageous to subject the equipment to an acid wash with acidic material such as 6N HCl solution, followed by a wash with a suitable solvent such as tetrachloroethane, carbontetrachloride, acetone and the like, the purpose of this treatment being to remove any foreign matter which may be present in the system. Following this treatment the system is dried by passing dry nitrogen therethrough.

After the above treatment, it is generally the practice to pass fluorine through the system in order to condition the equipment for exposure to $UF_6$. The fluorine utilized in conditioning is consumed for the most part by reaction with the metal of the apparatus. Some of the fluorine is lost to the atmosphere through leakage, and any residual fluorine is consumed by reaction with any decomposed $UF_6$ present in the feed material to the system.

Referring now more particularly to Fig. 2 which shows the internal construction of one suitable form of diffusion column 10, it will be seen that 80 represents the inner tube through which passes the heating medium in the form of high temperature steam. It is disposed within, but spaced from, an outer tube 81 which acts as a cold wall with the tubes being joined together near their extremities by welds 83 or other appropriate means, in order to reduce or control the temperature of the outer tube or wall 81. It may be jacketed for the circulation of cold water. One form of jacket 83 may be supported on the outer wall 81 through externally screwthreaded sleeve 84 welded or supported at 85 on tube 80 and by screwthreaded collar 86 at one end, and by a packing joint including sleeve 87 welded at 88 to tube 81, packing collar 89 carried by jacket 83, and enclosure ring 90 mounted by studs 91 on the collar 89, at the other end. Extensions 92, 93 on the jacket 83 communicate with supply and return lines (not shown) for circulation of water around the cold wall. Studs or adjusting screws 94 may be employed to position the jacket 83 with respect to the cold wall 81. At the lower end of column 10, nipple or extension 95 serves as a feed inlet for connection to a feed line, while nipple or extension 96 is connected to a line or monorail for exit of the feed and heavier fluids. At the top of the column, circular nipples 97, 98, carried by the outer wall 81, serve to communicate with the channel between inner hot tube 80 and outer cold tube 81 to permit removal or circulation of the lighter materials. Finally a sample nipple 99 (Fig. 1) similar to nipples 95, 96 may be provided at the lower end of the outer tube 81 for removing and sampling material.

After the system has been conditioned as described above, fresh feed material, contained in a storage tank 1 under high pressure, is caused to flow through a transfer line 5 and enters the bottom of the first column 10 on the inlet side, filling the annular space between the hot and cold walls. Immediately, the fresh feed stream flows out of the exit side of the column and out through the bottom monorail or connecting link 12 which connects the bottoms of all the columns in the rack. The fresh feed stream passes through each subsequent column along the rack. Flow is accomplished by a convection loop 13, and the rate of flow can be varied as desired by varying the temperature differential across the convection loop.

Shortly after the distribution of fresh feed to the bottoms of the columns, thermal diffusion commences and causes a gradient in the relative concentration of light and heavy fresh feed constituents in a manner heretofore described. The heavy constituents, concentrated in the bottoms of the columns, are absorbed into the stream of fresh feed flowing through the lower portion of the column 10 and the bottom monorail 12, and return, along with the undistributed feed, to the high pressure storage tank 1, from which it re-enters the diffusion apparatus for re-processing.

In the preferred operation of this invention, the initial half cycle as heretofore outlined is permitted to continue until sufficient light constituents are accumulated in the tops of the columns to completely fill the top monorail 56 and light product receiver 32 connected thereto. It should be noted, however, that during the filling and initial diffusion cycle, the top monorail 56 or light product circulation system, is frozen off by means of freeze lines 36, 40 and 45, and freeze-off points between columns, hereafter described in detail, thus causing the light product to remain in the top sections of the diffusion columns. This method of operation is necessary to maintain a constant pressure throughout the diffusion apparatus, and eliminate the possibility of "pitching," an undesirable condition heretofore described.

When sufficient light product has accumulated in the top sections of the columns, the bottom monorail 12 or fresh feed circulation system, is partially frozen off, as hereinafter described, halting the recycle operation and permitting only the admission of fresh feed to the bottoms of the columns. The top monorail 56 is partially unfrozen as hereinafter described, to permit the accumulated light product to flow from the tops of the columns into the light product receiver 32 and top monorail 56, the fresh feed entering the bottoms of the columns acting to force the light product up and out of the tops of the columns.

It is also possible to operate this invention without performing the initial diffusion cycle by filling the top monorail 56 and receiver 32 with fresh, non-diffused feed, and immediately thereafter commencing the regular diffusion cycle. Although this method is operable, it is not preferred since it has been found that the light product, accumulating in the light product receiver 32, reaches the desired enhancement in a shorter period of time if the top circulation system is intitially filled with partially enhanced material.

After the top circulation system and light product receiver has been filled by either of the methods described above, regular cyclical operation is commenced by alternating diffusion and product removal cycles, at regular, predetermined intervals, by means of alternating top and bottom circulation.

The following detailed description of one embodiment of operation, in which reference is made to the attached drawing, is deemed to be an exemplary, but not limiting, application fo my invention to the separation of uranium isotopes.

A shipping container (not shown) containing $UF_6$ is connected to high pressure storage tank 1, and the container is heated by any suitable means such as a heating jacket thereby causing the $UF_6$ to vaporize and pass into tank 1.

Fresh feed material, comprising highly compressed, gaseous $UF_6$, is contained under a pressure of 1500 p.s.i. in the heated high-pressure storage tank 1, in which the temperature is maintained between 446° and 554° F. Heat for the storage tank is derived from steam coil 2 containing 100 p.s.i. saturated steam flowing from steam header 16 through line 3 and thence to drain 4, and from inner steam coil 72 to which is fed steam from 1000 p.s.i. header 73 at pressures controlled by control valve 74 in connecting line 75. Fresh feed is caused to flow from high-pressure storage tank 1 through a jacketed transfer line 5, to which jacket connections are provided for the introduction of 100 p.s.i. saturated steam through line 6, and cold water through line 7. Admission of steam or cold water to the jacket is controlled by solenoid valves 8 and 9 respectively, which are remotely operated from a time cycle control instrument located in the rack control room.

In the presence of steam in the jacket, the fresh feed flows through transfer line 5 and enters the first column 10 in the rack at connection 11. Simultaneously the fresh feed enters the bottom monorail 12, of which connection 11 is the beginning which connects the bottom sections of all of the columns in the rack in a continuous circuit or loop with the feed tank. Flow is maintained by means of a convection loop 13 which is part of the bottom monorail 12 and comprises a high temperature leg 14, which is heated by steam line 15 containing 100 p.s.i. saturated steam from steam header 16, and a low temperature leg 17, which is heated by steam line 18 containing 5 p.s.i. saturated steam from steam header 19. The convection loop heated in this manner contains liquid of different density in its two legs and produces adequate pressure differential to move the material through the system at a predetermined velocity. The feed enters the column 10 and then flows through the monorail system providing fresh feed for subsequent columns, and returns to the high-pressure storage tank 1 by means of freezer coil 20, link line 21, and jacketed return line 22. Freezer coil 20 is provided with an air connection 23 and cold water connection 24, the admission of air or cold water being controlled by solenoid valves 25 and 26 respectively which are also remotely operated from the time cycle control equipment (not shown). The jacket surrounding return line 22 is provided with connections for the introduction of 100 p.s.i. saturated steam through line 27 and cold water through line 28, controlled by remotely operated solenoid valves 29 and 30, respectively.

The bottom monorail 12, freezer coil 20, and the link 21 are contained in a duct 31, which encloses the bottom sections of all the columns in the rack, and in which an ambient temperature of approximately 130° F. is maintained by additional steam lines not shown on the drawing, and by radiated heat from the columns themselves.

Shortly after the distribution of fresh feed to the bottoms of the columns, and while the top monorail 56 is frozen off by means of freeze lines 36, 40 and 45 and freeze off points between columns, thermal diffusion commences and in the resultant separation of isotopes the light isotope material flows upward, by thermal convection, along the hot wall inside the column, resulting in a concentration of light isotope material in the top section of the column. At the same time, the heavy isotope material is caused to flow downward, by thermal convection, near the cold wall inside the column, resulting in a concentration of heavy isotope material in the bottom section of the column. This heavy isotope material is adsorbed into the stream of fresh feed flowing through the bottom monorail system 12 and returns, with the feed, through heater-freezer coil 20, link line 21, and jacketed return line 22, to high-pressure storage tank 1, from whence it enters, along with the fresh feed from the storage tank, transfer line 5, and re-enters the diffusion apparatus for re-processing.

Initial circulation through the bottoms of the columns is continued until sufficient light isotope product has been accumulated in the top sections of the columns to fill the nickel light product receiver 32. The bottoms circulation is then partially stopped by closing steam valve 29 and opening cold water valve 30, thus admitting cold water to the jacket surrounding return line 22 which acts to freeze the material flow at this point. Feed is permitted to continue to flow from the storage tank into the columns, which acts to push the accumulated light isotope product out of the tops of the columns through the top monorail 56 and into light product receiver 32, which has been conditioned in a manner indicated above. It is estimated that the light isotope product contained in the top one-third of the columns is sufficient material (approximately 65 lbs.) to fill the light product receiver.

In order that the light material in the tops of the columns may be made to flow into the light product receiver, it is necessary that the circulation system around the tops of the columns is unfrozen. This is accomplished at the same time that bottoms circulation is partially stopped and the unfreezing of the top circulation system is performed remotely through solenoid valves as follows:

100 p.s.i. saturated steam from header 16 is admitted through line 35 to the jacket surrounding transfer line 36 by opening solenoid valve 37. The jacket surrounding transfer line 36 also has connection for the admission of cold water for freeze-off through line 38, and is controlled by solenoid valve 39 which is, of course, closed during the admission of steam to the jacket. Both solenoid valves 37 and 39 are controlled remotely from the cycle equipment. The admission of steam to the transfer line jacket causes the line to unfreeze. Simultaneously, solenoid valve 44 in water line 43 is closed and air is admitted to the jacket of top freezer coil 40 through line 41 by opening solenoid valve 53 in line 54. Water line 43 may also be employed for the admission of cold water for freezing off the coil, and admission is controlled by solenoid valve 44. After closing solenoid valve 49 in water line 48, 100 p.s.i. saturated steam is also introduced into the jacket of return line 45 through steam line 46 and solenoid valve 47. Cold water can also be introduced into this jacket through water line 48 and solenoid valve 49 when it is desired to freeze return line 45. Simultaneously, solenoid valve 50 in the top material freeze-off line 51, which admits cold water from header 52, is closed, and the opening of solenoid valve 53 in line 54 admits air from air header 55, purging the cold water from freeze-off line 51 and freezer coil jacket 40, permitting the top monorail 56 and freezer coil 40, to absorb sufficient heat from the surrounding duct 57 and tubes 80 to permit flow of material. If desired, steam may be used to purge the water from as well as to unfreeze the desired lines, thus eliminating the air purge before introduction of steam.

The light isotope product is collected from the tops of the columns in top monorail 56 and flows through the top monorail, top freezer coil 40, link line 58, which is also contained in duct 57, and enters the product receiver 32. Flow of material through the system is caused by a convection loop 67 inserted in the top monorail 56 comprising a low temperature leg 68 heated by steam line 69 containing 5 p.s.i. saturated steam from header 19, and a high temperature leg 70 heated by steam line 71 containing 100 p.s.i. saturated steam from header 16. This has the effect of supplying more heat to one leg than the other, and lowers the density of the material in one leg more than the other, which induces circulation.

After the light product receiver has been filled, the top circulation system is again frozen by closing solenoid valves 37 and 47, thereby shutting off the steam from transfer line 36 and return line 45. Solenoid valves 39, 44 and 49 are then opened, thereby admitting cold water to the transfer line, top heater-freezer coil, and return line, causing material flow to be frozen at these points. Simultaneously, solenoid valve 50 in the top material freeze-off line 51 is opened admitting cold water to this line which acts to freeze off the top monorail 56 at contact points between columns, thus preventing further circulation of material through the tops of the columns.

After the freezing of the top circulation system is complete, circulation is re-established through the bottoms of the columns and is permitted to continue for a period of two hours. At the end of this period, circulation is completely stopped in the bottoms of the columns by freezing the bottom monorail 12 at the points of contact with bottom freeze of line 51a, and the top circulation system is again unfrozen permitting light isotope product to flow into the tops of the columns and into the light product receiver tank. The old material taken off during the previous cycle is withdrawn from the bottom of the light product receiver tank by transfer line 36 and is introduced, at the last column in the rack 59 through connection 60, which is the beginning of the top monorail 56. The material re-enters this column and subsequently flows through the monorail and is distributed to the subsequent columns in the rack.

Light isotope product from the previous diffusion cycle is picked up by this recycle stream and is carried through the monorail, through top freezer coil 40, link line 58, and is returned to the light product receiver through return line 45.

This circulation is permitted to continue for a period of, for example, two hours, and normal operation, consisting of approximately two-hour diffusion and removal cycles are alternatingly continued thereafter.

Light isotope product is removed from time to time by freezing off the top circulation system, closing valves 61 and 62 which are packed with a suitable inert material such as poly-tetrafluorethylene and disconnecting the light product receiver by means of connectors 63 and 64. The receiver may then be removed and replaced by an empty receiver which may be initially filled in a number of ways as pointed out below.

The light product receiver is contained in a steam coil 65 and the temperature of the receiver is maintained between 212° and 248° F. by means of control valve 66.

After the material in storage tank 1 has been depleted of light isotope by processing through the system, transfer line 5 and return line 22 are frozen, the storage tank 1 is disconnected from the system, connected to a suitable receiver (not shown) and heated to transfer the depleted material thereto. Following the removal of depleted material, the storage tank 1 is then disconnected from the receiver, connected to another shipping container and filled in the manner previously indicated.

In the process for the separation of the isotopes of uranium heretofore described as an exemplary application of my invention, there are certain methods of operation critical to successful attainment of the objects of this invention.

The most difficult and the most important of these methods comprises the filling of the light product receiver prior to commencing the regulator operating cycles. As previously discussed, the preferred method of operation includes the step of filling the light product receiver with partially enhanced material. Although this invention is operable using raw, non-diffused feed for filling the light product receiver, it is known that this method requires one or two additional days of cyclical operation to attain the desired enhancement over the time required to attain the same assay of product using a material enhanced to approximately 50% of the desired final product in the top circulating system prior to regular cyclical operation.

The preferred method of filling the light product receiver requires approximately ¾ of an hour and can be accomplished without experiencing "pitching" in the columns if the resistance to flow from the tops of the columns to the light product receiver is maintained somewhat greater than the resistance to flow from the feed storage tank to the tops of the columns during the filling operation. Otherwise, the material will flow out of the tops of the columns into the light product receiver more rapidly than it can flow up the columns thus lowering the pressure at the top and permitting "pitching" to occur. A successful procedure in accomplishing the desired result comprises the introduction of fresh feed from the feed storage tank at approximately 1500 pounds per square inch into the bottom circulation system, preferably not through a convection loop, by means of a by-pass line (not shown), and flowing the light product, accumulated in the tops of the columns, into the light product receiver, through the top circulation system, preferably through a convection loop. One of the valves on the light product receiver is completely closed while the other is only slightly opened in order to control the pressure in the top circulation system.

After the top circulation system has been filled, it is desirable to permit the tops of the columns to proceed for approximately 12 to 24 hours before beginning top circulation. This is done in order that the concentration of the desired component at the tops of the columns will be higher than that in the light product receiver at the start of top circulation.

Flow is controlled throughout the apparatus by means of external freeze-off valves. Rate of flow is controlled by convection loops connected directly to the circulation systems. These methods for controlling flow and rate of flow utilize, in the case of liquid uranium hexafluoride, the physical characteristics of this media as set forth in the following vapor pressure-temperature table:

*Vapor pressure of $UF_6$*

| Temperature: | Pressure, pounds/in.² |
|---|---|
| 56° C. (sublimination point) | 15 |
| 65° C. (freezing point) | 23 |
| 80° C. | 37 |
| 100° C. | 63 |
| 118° C. | 97 |
| 137° C. | 133 |
| 162° C. | 220 |
| 200° C. | 440 |
| 230° C. | 720 |
| 232° C. (critical point). | |

The maintenance of a rapid circulation rate through the system is extremely desirable if satisfactory results are to be obtained in the minimum possible time. For example, in the process described above, if the flow rate is only 3 pounds per hour over 100 hours of bottom circulation would be required to pass the 350 pounds of material in the fresh feed storage tank through the circuit just once.

In this case, in order to obtain the desired concentration of light component in the tops of the columns, the fresh feed must be completely depleted in one pass through the system. Since, in preferred operation, the desired concentration is achieved in about 40–60 hours of bottom circulation, including recycle time, it is obvious that the critical flow rate is considerably higher than 3 pounds per hour. From the rate of rise of concentration of the material in the light product receiver; from the difference in concentration between the in and out flowing fluid, which concentration may be determined by withdrawing a sample from line 36 through sampling tit 36a and by withdrawing a sample from line 45 through sampling tit 45a, and from the number of hours of bottom circulation, I have found it is possible to determine the preferred flow rate from the equation:

$$v = \frac{(E_2 - E_1)W}{\int_{t=0}^{t=t}(C_i - C_o)dt}$$

where
$v$=flow rate in pounds per hour in bottom circulation (assumed constant).
$E_2-E_1$=increase in concentration of fluid in light product receiver over the period of time $t$.
$W$=pounds of fluid in feed storage tank.
$C_i-C_o$=difference in concentration between in and out flowing fluid.
$t$=time in hours.

If $C_i-C_o$ is constant over a period for which $E_2-E_1$ is known, the equation can be written:

$$\text{Flow rate} = \frac{\text{(points increase in concentration) (pounds material feed in storage tank)}}{\text{(points difference in concentration (hours of between in and out flowing material) circulation}}$$

Using the equation, the preferred flow rate, I have found, is indicated to be between 8–10 pounds per hour, although under certain conditions such as that involving a more streamlined flow of process material, flow rates as high as 30 pounds per hour may be desirable.

While my invention has been described with reference to certain particular embodiments and with reference to certain particular forms of apparatus, it is to be understood that my invention is not limited thereby. Therefore, changes, additions, and/or omissions such as increasing or decreasing operating temperatures and/or pressures, or substituting mechanical means for controlling flow and/or rate of flow, may be made without departing from the spirit of my invention as defined in the appended claims.

For example, although it is a prime object of my invention to eliminate the necessity of recurrently adding fresh feed material to the bottom circulating system in order that the pressure drop in the system during the withdrawal of light product be controlled within a certain limit, it is possible to draw off small amounts of light product from time to time providing steps are taken to replace sufficient fresh feed to maintain the desired pressure in the system or by increasing the temperature of the fresh feed storage tank sufficiently to create the additional make-up pressure required to maintain the desired pressure in the diffusion columns. This can be accomplished without departing from the spirit of my invention wherein the basic control of pressure drop in the diffusion zones is accomplished through a continuous recycling of feed and product.

I claim:

1. In a process for the separation of fluids of varying thermal diffusion coefficients which comprises passing said fluids into a plurality of diffusion zones maintained under conditions of temperature and pressure favoring the separation of said fluids into a fraction rich in light product and a fraction rich in heavy product, the steps of withdrawing said light product overhead from said diffusion zones while circulating light product through the upper portion of said zones from a reservoir connected thereto thereby maintaining a constant pressure in said diffusion zones during said withdrawal.

2. In a process for the separaton of fluids of varying thermal diffusion coefficients which comprises passing said fluids into a plurality of columnated diffusion zones maintained under conditions of temperature and pressure favoring the separation of said fluids into a fraction rich in light product and a fraction rich in heavy product, the steps comprising withdrawing said light product from said columnated diffusion zones, recycling said light product through the tops of said columnated diffusion zones and accumulating said light product in a reservoir, while maintaining a constant pressure in said columnated diffusion zones.

3. In a process for the separation of fluids of varying molecular types of thermal diffusion which comprises passing said fluids into a plurality of columnated diffusion zones maintained under conditions of temperature and pressure favoring the separation of said fluids into a fraction rich in light product and a fraction rich in heavy product, the steps comprising alternately solidifying said light and heavy product from said columnated diffusion zones and separately removing them into a light product receiver and heavy product receiver.

4. A system for separating fluids by thermal diffusion comprising a series of diffusion columns for separating fluids into light and heavy fractions, means for connecting the upper portions of the columns in cascade, means for connecting the lower portions of said columns in cascade, means for circulating the lighter fraction through the upper portion of said columns, additional means for circulating the heavy fraction through the lower portions of said columns, heat control means disposed in the upper and lower connecting means for alternately solidifying the light fraction and the heavy fraction to permit their separate withdrawal from the system, and reservoirs connected to the upper and lower connecting means for the accumulation of the light and heavy fractions of said fluids.

5. In a process for the separation of the isotopes of uranium by liquid thermal diffusion which comprises passing liquefied uranium hexafluoride into a plurality of columnated diffusion zones maintained under conditions of temperature and pressure favoring the separation of said liquid uranium hexafluoride into a fraction rich in the lighter isotopes and a fraction rich in the heavier isotope, the steps comprising alternately solidifying said light fraction and said heavy fraction and separately removing them from said columnated diffusion zones while alternately recycling said light and heavy fractions through said columnated diffusion zones, and accumulating said light fraction and heavy fraction in separate reservoirs.

6. In an apparatus for the separation of fluids of varying molecular types into light and heavy fractions by thermal diffusion comprising a plurality of diffusion columns each having means for feeding said fluids to said columns and outlet means for separately withdrawing said light and heavy fractions from said columns, the improvement comprising means for controlling the temperature of said outlet means for converting said light fraction to the liquid and to the solid phase for controlling its flow, means for feeding said light fraction to a container, and convection loops for continuously recycling said light and heavy fractions whereby a constant pressure is maintained in said diffusion column during the withdrawal and accumulation of said light fraction.

7. In an apparatus for the separation of fluids of varying molecular types into light and heavy fractions by thermal diffusion comprising a plurality of diffusion columns each having means for feeding said fluids to said diffusion columns and outlet means for separately withdrawing said light and heavy fractions from said columns, the improvement comprising a convection loop and line for withdrawing said light fraction, a container connected to the line for receiving the light fraction, and means for recycling said light fraction through the top section of said diffusion columns thereby maintaining a constant pressure in said diffusion columns during the withdrawal and accumulation of said light fraction.

8. In an apparatus for the separation of fluids of varying thermal diffusion coefficients into light and heavy fractions comprising a plurality of diffusion columns and a line for separately withdrawing said light fraction from said columns, the improvement comprising a convection loop in said feeding line and a convection loop in said withdrawing line for withdrawing said light and heavy fractions from the top and bottom sections, respectively, of said diffusion columns, means for alternately solidifying the heavy fraction and the light fraction to permit their separate withdrawal, and means for separately accumulating said light and heavy fractions in containers, whereby a constant pressure is maintained in said diffusion columns during the withdrawal and accumulation of said light and heavy fractions.

References Cited in the file of this patent

UNITED STATES PATENTS

| | | |
|---|---|---|
| 2,158,238 | Hvid | May 16, 1939 |
| 2,258,594 | Brewer et al. | Oct. 14, 1941 |
| 2,521,112 | Beams | Sept. 5, 1950 |

OTHER REFERENCES

Smyth: "Atomic Energy for Military Purposes," pages 117, 118, 121, 127, 128, 147 (August 1945). Copy may be purchased from Supt. of Documents.

UNITED STATES PATENT OFFICE
CERTIFICATE OF CORRECTION

Patent No. 2,905,527                                            September 22, 1959

Malcolm Dole

It is hereby certified that error appears in the printed specification of the above numbered patent requiring correction and that the said Letters Patent should read as corrected below.

Column 2, line 9, for "modiflcations" read -- modifications --; line 27, for "clumns" read -- columns --; line 28, for "fr removal," read -- for removal, --; line 55, for "$_{91}U^{235}$" read -- $_{92}U^{235}$ --; column 3, line 10, for "column." read -- columns. --; column 4, line 20, for "contain" read -- containing --; line 38, for "appartus" read -- apparatus --; column 7, line 4, for "fo my" read -- of my --; column 11, line 25, in the equation, after "circulation" insert a closing parenthesis; column 12, line 20, for "portion" read -- portions --; line 54, for "column" read -- columns --; line 71, after "columns" insert -- each having a line for feeding said fluids to said diffusion columns --.

Signed and sealed this 19th day of April 1960.

(SEAL)
Attest:

KARL H. AXLINE                                        ROBERT C. WATSON
Attesting Officer                                  Commissioner of Patents